US006764372B1

(12) United States Patent
Rae

(10) Patent No.: US 6,764,372 B1
(45) Date of Patent: Jul. 20, 2004

(54) PUPPET BOOK KIT AND METHOD OF USING

(76) Inventor: Rita Rae, 835 Brown Ave., St. Paul, MN (US) 55107

( * ) Notice: Subject to any disclaimer, the term of this patent is extended or adjusted under 35 U.S.C. 154(b) by 0 days.

(21) Appl. No.: 10/354,466

(22) Filed: Jan. 29, 2003

(51) Int. Cl.[7] ............................................. A63J 19/00

(52) U.S. Cl. ............................ 446/82; 446/71; 446/72; 446/83

(58) Field of Search .......................... 434/178; 283/51, 283/15.1; 446/71, 73, 82, 83, 84, 147, 149

(56) References Cited

U.S. PATENT DOCUMENTS

| | | | | |
|---|---|---|---|---|
| 1,490,295 A | * | 4/1924 | Stephens | 434/178 |
| 3,918,180 A | * | 11/1975 | Chamberlin | 434/178 |
| 4,233,772 A | * | 11/1980 | Hamar | 446/149 |
| 4,341,521 A | * | 7/1982 | Solomon | 434/236 |
| 4,445,869 A | * | 5/1984 | Wasserman | 434/156 |
| 4,508,515 A | * | 4/1985 | Skolnick | 446/148 |
| 4,874,340 A | * | 10/1989 | Smallwood | 446/28 |
| 5,951,298 A | * | 9/1999 | Werzberger | 434/178 |
| 6,210,172 B1 | * | 4/2001 | Clements | 434/428 |
| 6,506,093 B2 | * | 1/2003 | Avital | 446/83 |

* cited by examiner

Primary Examiner—Kurt Fernstrom

(57) ABSTRACT

A puppet book kit and associated method of using the puppet book kit are disclosed. The puppet book kit comprises a plurality of pages, a cover, an aperture traversing through each of the pages and through the cover to form a three dimensional void, a backdrop curtain, a slide out panel, at least one card holder, a plurality of story cards, and at least one marionette. The plurality of pages is bound together to the cover along one common edge. The backdrop curtain is attached onto the cover, in which the backdrop curtain covers over the cover aperture. The slide out panel is slidably attached to the cover, wherein the slide out panel is mounted over the cover aperture and positioned under the backdrop curtain. Each card holder is attached to each corresponding page in which each story card is attachable to each card holder. Each marionette as a handle and a torso attached to the handle, in which the torso of the marionette is insertable through the cover aperture therein and extendible inwardly through the page apertures wherein the torso of the marionette is sized to pass through the aperture in each of the pages as the pages are turned. The method of using the kit comprises the steps of adjoining, attaching, moving, obtaining, reading, removing, repeating, sliding, supporting, taking, and turning.

14 Claims, 3 Drawing Sheets

PUPPET BOOK KIT AND METHOD OF USING

FIELD OF THE INVENTION

The present invention relates to educational equipment, more particularly, to a puppet book kit as a means for teaching children how to read which is also enjoyable to children.

DESCRIPTION OF THE PRIOR ART

It is sometimes difficult to interest young children in reading books. Children often loose interest in reading conventional books. It is well recognized that the reading and learning processes are enhanced when the child's interest is maximized in some manner.

The prior art has addressed this problem by incorporating entertainment features into children's books to enhance the children's interest in the book. Such books have been designed so that the books are visually attractive and have eye-catching features. Such entertainment features have comprised, for example, pop up figures, puppets or other items that are attached to or coordinated with a book.

Puppets and puppet shows have, of course, long been known and the effectiveness of the use of puppets to capture the attention and imagination of children has long been recognized. Children's books of the conventional form have, of course, also long been known although the difficulty of maintaining the interest of the very young child for an extended period while the conventional form of book is being read to the child is generally recognized. Indeed, the difficulty of interesting a child who has learned to read in reading books, particularly with the television competing for the child's time, is also great.

A child's desire to read may be limited by the attention span of the child. A young child may pick up a conventional book and initially be interested in the book because the child can touch and feel the cover and exterior surfaces of the book. However, once the child becomes familiar with the outline of the book the child may become disinterested in the book. Since children have a natural attraction for toys and small physical objects, often children are more attentive and will want to read a book longer if a toy or small physical object is associated with the book.

The learning process may be further enhanced if a child is able to see, touch and/or feel a three-dimensional object being discussed on the pages of a book. Often times, simply having the child read the words is inadequate for the child's complete understanding of the material printed on the book pages. A child may be better able to understand the subject matter of the book if the child is able to touch or feel a three-dimensional object which is representative of the subject matter of the book.

A wide variety of books is currently available on the commercial market and an even larger number of these types of devices are known in the art of books, for example, the animated toy book disclosed by Cross in U.S. Pat. No. 1,139,643; the puppet book structure disclosed by Chamberlin in U.S. Pat. No. 3,918,180; the psychotherapeutic device disclosed by Solomon in U.S. Pat. No. 4,341,521; the educational book with interactive elements disclosed by Thorsheim and Roberts in U.S. Pat. No. 4,537,576; the children's books disclosed by Mayer et al. in U.S. Pat. No. 4,932,679; the three-dimensional book disclosed by Vap in U.S. Pat. No. 5,915,729; and the children's activity book disclosed by Stajan and Krmelj in U.S. Pat. No. D295,538.

While all of the above-described devices fulfill their respective, particular objectives and requirements, the aforementioned patents do not describe a puppet book kit having a a plurality of pages, a cover, an aperture traversing through each of the pages and through the cover to form a three dimensional void, a backdrop curtain, a slide out panel, at least one card holder, a plurality of story cards, and at least one marionette. This combination of elements would specifically match the user's particular individual needs of making it possible to provide a teacher a means for teaching children how to read which is enjoyable to children. The above-described patents make no provision for a puppet book kit having a plurality of pages, a cover, an aperture traversing through each of the pages and through the cover to form a three dimensional void, a backdrop curtain, a slide out panel, at least one card holder, a plurality of story cards, and at least one marionette.

Therefore, a need exists for a new and improved puppet book kit having a plurality of pages, a cover, an aperture traversing through each of the pages and through the cover to form a three dimensional void, a backdrop curtain, a slide out panel, at least one card holder, a plurality of story cards, and at least one marionette. In this respect, the puppet book kit according to the present invention substantially departs from the conventional concepts and designs of the prior art, and in doing so provides an apparatus primarily developed for the purpose of providing a means for teaching children how to read which is also enjoyable to children.

SUMMARY OF THE INVENTION

The present kit and method of using, according to the principles of the present invention, overcomes the shortcomings of the prior art by providing a puppet book kit and method of using is disclosed. The puppet book kit comprises a plurality of pages, a cover, an aperture traversing through each of the pages and through the cover to form a three dimensional void, a backdrop curtain, a slide out panel, at least one card holder, a plurality of story cards, and at least one marionette. The plurality of pages is bound together to the cover along one common edge. The backdrop curtain is attached onto the cover, in which the backdrop curtain covers over the cover aperture. The slide out panel is slidably attached to the cover, wherein the slide out panel is mounted over the cover aperture and positioned under the backdrop curtain. Each card holder is attached to each corresponding page in which each story card is attachable to each card holder. Each marionette as a handle and a torso attached to the handle, in which the torso of the marionette is insertable through the cover aperture therein and extendible inwardly through the page apertures wherein the torso of the marionette is sized to pass through the aperture in each of the pages as the pages are turned. The method of using the kit comprises the steps of adjoining, attaching, moving, obtaining, reading, removing, repeating, sliding, supporting, taking, and turning.

In view of the foregoing disadvantages inherent in the known type puppet book kit now present in the prior art, the present invention provides an improved puppet book kit, which will be described subsequently in great detail, is to provide a new and improved puppet book kit which is not anticipated, rendered obvious, suggested, or even implied by the prior art, either alone or in any combination thereof.

To attain this, the present invention essentially comprises a plurality of pages, a cover, an aperture traversing through each of the pages and through the cover to form a three dimensional void, a backdrop curtain, a slide out panel, at least one card holder, a plurality of story cards, and at least one marionette. The plurality of pages is bound together to the cover along one common edge. The backdrop curtain is attached onto the cover, in which the backdrop curtain covers over the cover aperture. The slide out panel is slidably attached to the cover, wherein the slide out panel is mounted over the cover aperture and positioned under the backdrop curtain. Each card holder is attached to each corresponding page in which each story card is attachable to each card holder. Each marionette as a handle and a torso attached to the handle, in which the torso of the marionette is insertable through the cover aperture therein and extendible inwardly through the page apertures wherein the torso of the marionette is sized to pass through the aperture in each of the pages as the pages are turned.

There has thus been outlined, rather broadly, the more important features of the invention in order that the detailed description, thereof that follows may be better understood, and in order that the present contribution of the art may be better appreciated.

The invention may also include an optional spiral binder spine 32 attaching the plurality of pages 12 and the cover 14 together. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved puppet book kit that has all the advantages of the prior art puppet book kit and none of the disadvantages.

It is another object of the present invention to provide a new and improved puppet book kit that may be easily and efficiently manufactured and marketed.

An even further object of the present invention is to provide a new and improved puppet book kit that has a low cost of manufacture with regard to both materials and labor, and which accordingly is then susceptible of low prices of sale to the consuming public, thereby making such multipurpose storage unit and system economically available to the buying public.

Still another object of the present invention is to provide a new puppet book kit that provides in the apparatuses and methods of the prior art some of the advantages thereof, while simultaneously overcoming some of the disadvantages normally associated therewith.

Even still another object of the present invention is to provide a puppet book kit having a a plurality of pages, a cover, an aperture traversing through each of the pages and through the cover to form a three dimensional void, a backdrop curtain, a slide out panel, at least one card holder, a plurality of story cards, and at least one marionette. This combination of elements makes it possible to provide a teacher a means for teaching children how to read which is enjoyable to children.

Lastly, it is an object of the present invention to provide a new and improved method of using comprising the steps of adjoining, attaching, moving, obtaining, reading, removing, repeating, sliding, supporting, taking, and turning.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
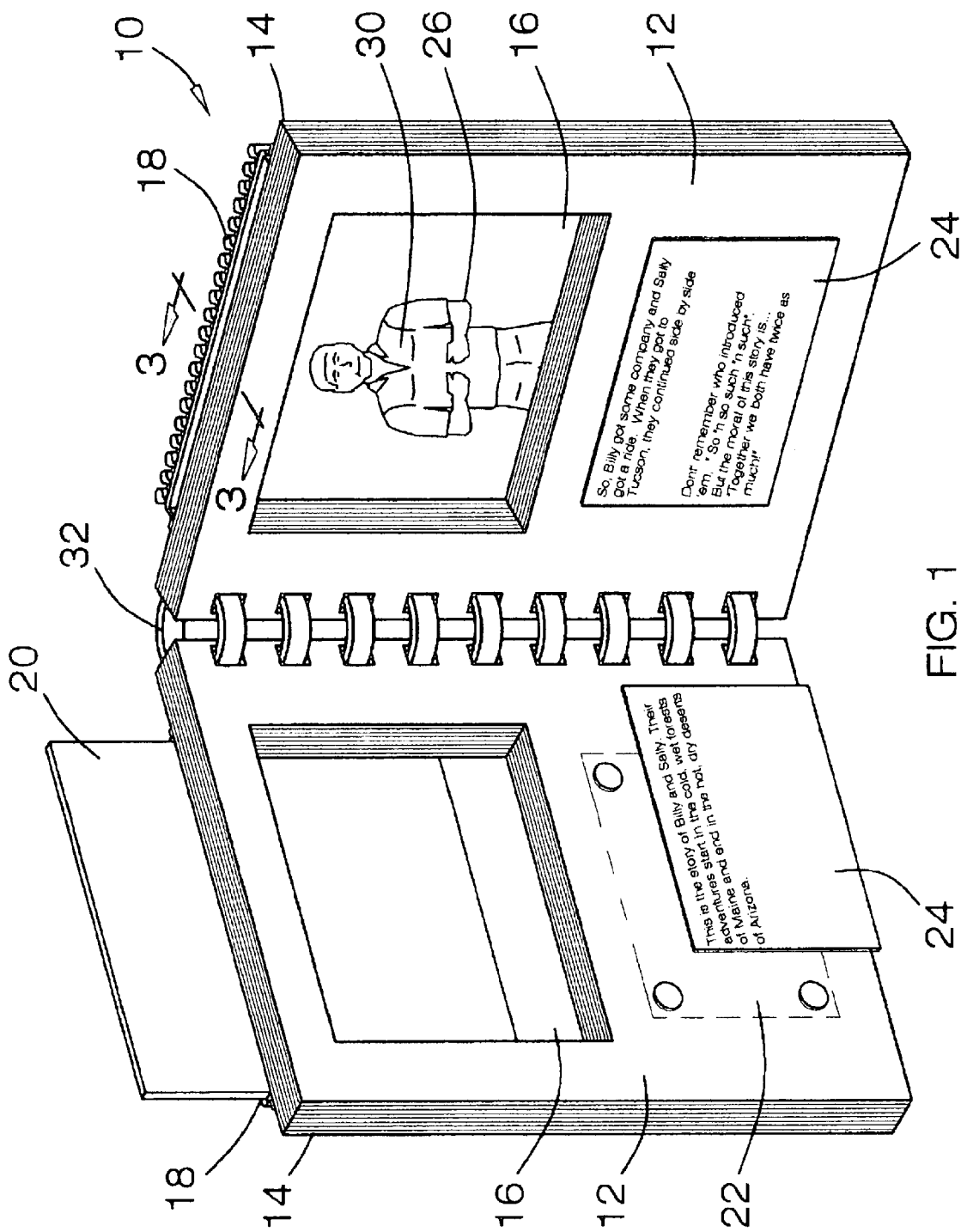
FIG. 1 is a perspective front plan view of an preferred embodiment of an opened up puppet book kit constructed in accordance with the principles of the present invention.
Figure 2:
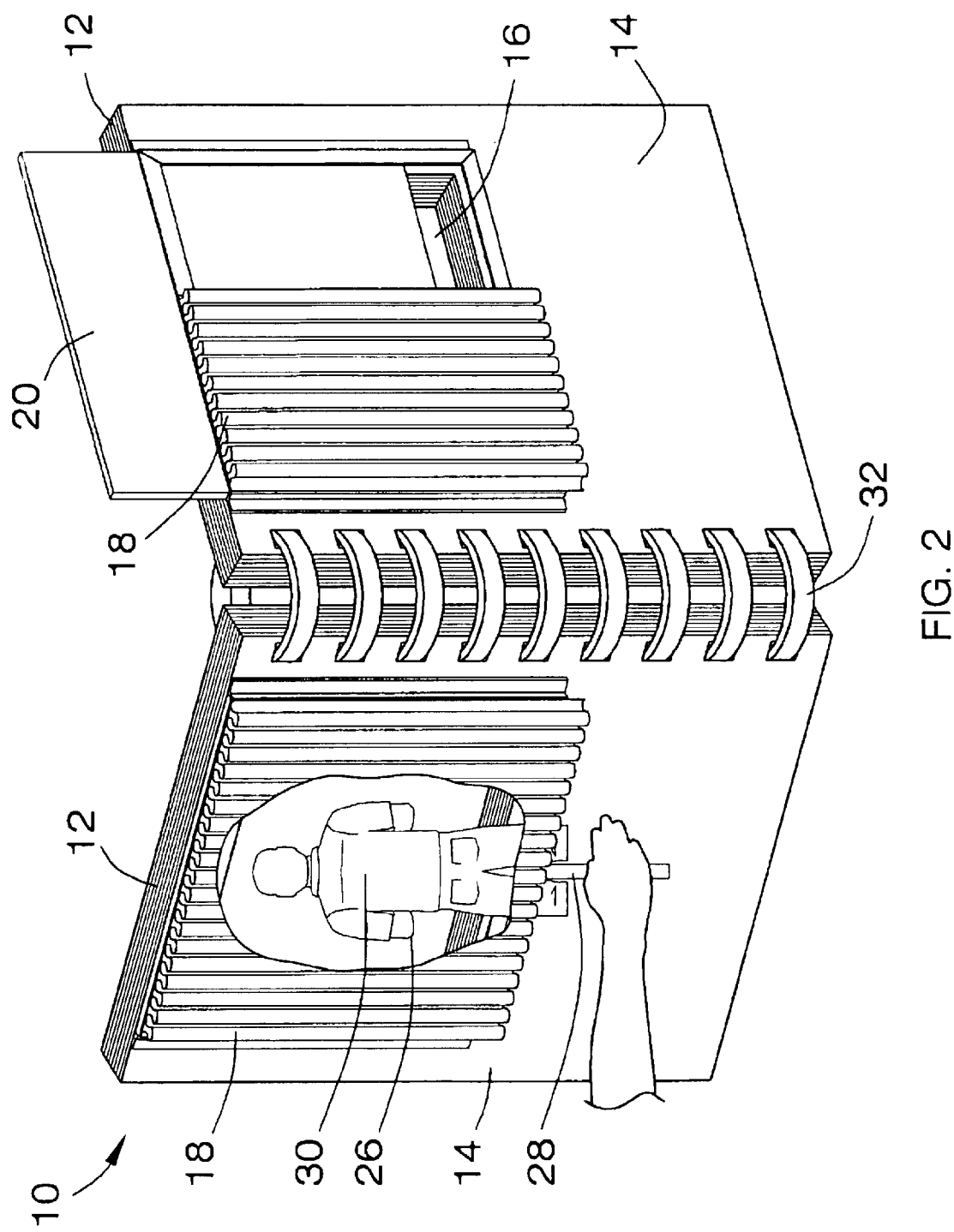
FIG. 2 is a perspective back plan view of a preferred embodiment of an opened up puppet book kit of the present invention.
Figure 3:
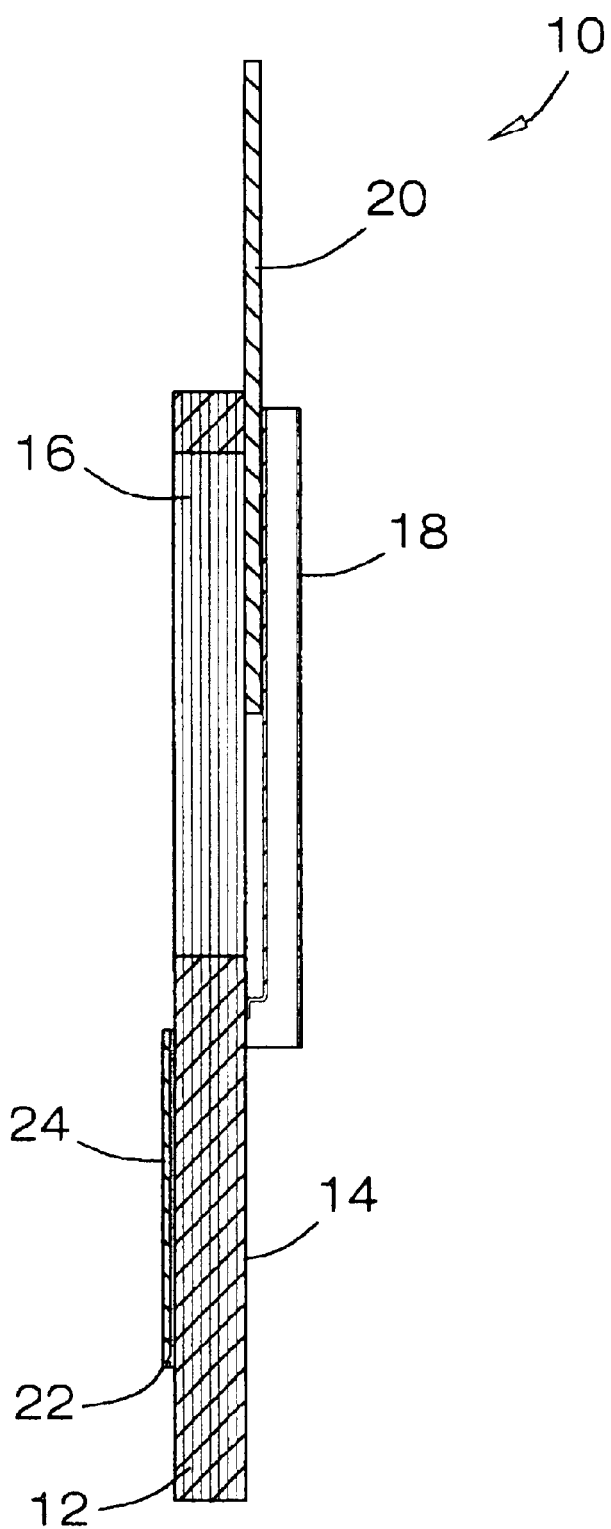
FIG. 3 is a cross sectional side view of a preferred embodiment of the puppet book kit of the present invention.

Referring now to the drawings, and in particular FIGS. 1 to 3 thereof, one preferred embodiment of the present invention is shown and generally designated by the reference numeral 10. One preferred embodiment of a puppet book kit 10 comprises: a plurality of pages 12, a cover 14, an aperture 16 in each of the pages 12 and in the cover 14, a backdrop curtain 18, a slide out panel 20, at least one card holder 22, a plurality of story cards 24, and at least one marionette 26. The plurality of pages 12 are bound together along one common edge. The cover 14 is also bound together along the one common edge of the plurality of pages 12. The aperture 16 in each of the pages 12 and in the cover 14 is positioned at substantially the same location on each page 12, so that the aperture 16 to define a three dimensional void. The backdrop curtain 18 is attached onto the cover 14, in which the backdrop curtain 18 covers over the cover 14 aperture 16. The slide out panel 20 is slidably attached to the cover 14, wherein the slide out panel 20 is mounted over the cover 14 aperture 16 and positioned under the backdrop curtain 18. Each card holder 22 is attached to each corresponding page 12. Each story card 24 is attachable to each card holder 22. Each marionette 26 has a handle 28 and a torso 30 attached to the handle 28, in which the torso 30 of the marionette 26 is insertable through the cover 14 aperture 16 therein and extendible inwardly through the page 12 apertures 16, wherein the torso 30 of the marionette 26 is sized to pass through the aperture 16 in each of the pages 12 as the pages 12 are turned.

An optional spiral binder spine 32 may be added to the kit 10 in which spiral binder spine 32 attaches the plurality of pages 12 and the cover 14 together.

An optional second cover 14, second backdrop curtain 18 and second slide out panel 20 may be added to the kit 10. The second cover 14 is bound together along one edge of the plurality of pages 12, in which the second cover 14 has a second cover 14 aperture 16 in the second cover 14, so that the second cover 14 aperture 16 is aligned with the page 12 apertures 16 to define the three dimensional void. The second backdrop curtain 18 is attached onto the second cover 14, so that the second backdrop curtain 18 covers the second cover 14 aperture 16. The second slide out panel 20 is slidably attached to the second cover 14, wherein the second slide out panel 20 is mounted over the second cover 14 aperture 16 and positioned under the second backdrop curtain 18, so that the torso 30 of the marionette 26 is insertable through the second cover 14 aperture 16 therein and extendible inwardly through the page 12 apertures 16.

Each page 12 may be single of two sided. One preferred configuration is that each page 12 hasg a front side and a back side, wherein each side of each page 12 has separate card holders 22 attached to each corresponding side of each page 12.

The dimensions of each page 12 aperture 16 may be any known size. One preferred configuration of the dimensions of each page 12 aperture comprises about twenty four inches wide by about twenty inches in height.

Each story card 24 of the plurality of story cards 24 may be plain or embossed with text. One preferred configuration of each story card 24 of the plurality of story cards 24 is that a portion of a story line text printed onto each story card 24 of the plurality of story cards 24. The card holder 22 of the kit 10 may comprise any commercially available means for holding cards to a surface. One preferred configuration of the card holder comprises a plastic sleeve attached to each page 12, wherein each story card 24 is insertable between the plastic sleeve and each page 12. Another preferred configuration of the card holder 22 comprises a first swath of material attached to each page 12 and a second swath of material attached to each story card 24, wherein the first and second swaths of material are reversibly lockable together. One perturbation of this preferred configuration is that the first swath of material comprises a plurality of minuscule hooks extending outwardly from the first swath of material, and the second swath of material comprises a plurality of minuscule loops extending outwardly from the second swath of material, wherein the plurality of minuscule hooks of the first swath of material are reversibly lockable together with the plurality of minuscule loops of the second swath of material. Another perturbation of this preferred configuration of the card holder comprises a plurality of minuscule loops extending outwardly from the first swath of material, and the second swath of material comprises a plurality of minuscule hooks extending outwardly from the second swath of material, wherein the plurality of minuscule loops of the first swath of material are reversibly locakable together with the plurality of minuscule hooks of the second swath of material. Yet another preferred configuration of the card holder 22 comprises is selected from the group consisting of adhesive tape, glue, and paste.

The backdrop curtain 18 may be made of any commercially available material. One preferred configuration of the backdrop curtain 18 comprises a cloth fabric.

Another preferred embodiment of the puppet book kit 10 consists essentially of: a plurality of pages 12 bound together along one edge; a cover 14 bound together along one edge of the plurality of pages 12; an aperture 16 in each of the pages 12 and in the cover 14, the page 12 apertures 16 positioned at substantially the same location on each page 12, and the cover 14 apertures 16 aligned with the page 12 apertures 16 to define a three dimensional void; a backdrop curtain 18 attached onto the cover 14, the backdrop curtain 18 covering around the cover 14 aperture 16; a slide out panel 20 slidably attached to the cover 14, wherein the slide out panel 20 is mounted over the cover 14 aperture 16 and positioned under the backdrop curtain 18; at least one card holder 22 attached to each page 12; a plurality of story cards 24, each story card 24 is attachable to each card holder 22; and at least one marionette 26, each marionette 26 having a handle 28 and a torso 30 attached to the handle 28, the torso 30 of the marionette 26 is insertable through the cover 14 aperture 16 therein and extendible inwardly through the page 12 apertures 16, the torso 30 of the marionette 26 is sized to pass through the aperture 16 in each of the pages 12 as the pages 12 are turned.

One preferred embodiment of a method of using a puppet book kit 10 for stimulating children to read, the method comprising the steps of adjoining, attaching, moving, obtaining, reading, removing, repeating, sliding, supporting, taking, and turning. The obtaining step comprises obtaining the kit 10 comprising: a plurality of pages 12 bound together along one edge; a cover 14 bound together along one edge of the plurality of pages 12; an aperture 16 in each of the pages 12 and in the cover 14, the page 12 apertures 16 positioned at substantially the same location on each page 12, and the cover 14 apertures 16 aligned with the page 12 apertures 16 to define a three dimensional void; a backdrop curtain 18 attached onto the cover 14, the backdrop curtain 18 covering around the cover 14 aperture 16; a slide out panel 20 slidably attached to the cover 14, wherein the slide out panel 20 is mounted over the cover 14 aperture 16 and positioned under the backdrop curtain 18; at least one card holder 22 attached to each page 12; a plurality of story cards 24, each story card 24 is attachable to each card holder 22, wherein each story card 24 of the plurality of story cards 24 having a portion of a story line text printed onto each story card 24 of the plurality of story cards 24; and at least one marionette 26, each marionette 26 having a handle 28 and a torso 30 attached to the handle 28, the torso 30 of the marionette 26 is insertable through the cover 14 aperture 16 therein and extendible inwardly through the page 12 apertures 16, the torso 30 of the marionette 26 is sized to pass through the aperture 16 in each of the pages 12 as the pages 12 are turned. The attaching step comprises attaching each story card 24 to a corresponding card holder 22 to sequentially build the story line. The supporting step comprises supporting the kit 10 onto an easel. The removing step comprises removing the slide out panel 20 attached to the cover 14. The turning step comprises turning open a given page 12 of the plurality of pages 12. The sliding step comprises sliding a portion of the marionette 26 underneath the backdrop curtain 18 and through the cover 14 aperture 16 so that the torso 30 of the marionette 26 passes through the aperture 16 of each of the unturned opened pages 12 of the plurality of pages 12. The reading step comprises reading out loud the portion of the story line text printed onto the story card 24 attached to the given page 12. The moving step comprises moving the torso 30 of the marionette 26 to mimic the portion of the story line text printed onto the story card 24 attached to the given page 12, the moving step performed simultaneous to the reading step. The repeating step comprises repeating the steps of turning, sliding, reading, and moving until the story line is performed. The taking step comprises taking out the marionette 26 from underneath the backdrop curtain 18 and away from the cover 14 aperture 16 so the marionette 26 no longer passes through the aperture 16 of each of the unturned opened pages 12 of the plurality of pages 12. The adjoining step comprises adjoining slidably the slide out panel 20 to the cover 14.

As to the manner of usage and operation of the present invention, the same should be apparent from the above description. Accordingly, no further discussion relating to the manner of usage and operation will be provided.

While a preferred embodiment of the puppet book kit has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A puppet book kit comprising:
   a plurality of pages bound together along one edge;
   a cover bound together along one edge of said plurality of pages;
   an aperture in each of said pages and in said cover, said page apertures positioned at substantially the same location on each page, and said cover apertures aligned with said page apertures to define a three dimensional void;
   a backdrop curtain attached onto said cover, said backdrop curtain covering around said cover aperture;
   a slide out panel slidably attached to said cover, wherein said slide out panel is mounted over said cover aperture and positioned under said backdrop curtain;
   at least one card holder attached to each page;
   a plurality of story cards, each story card is attachable to each card holder; and
   at least one marionette, each marionette having a handle and a torso attached to said handle, said torso of said marionette is insertable through said cover aperture therein and extendible inwardly through said page apertures, said torso of said marionette is sized to pass through the aperture in each of said pages as said pages are turned.

2. The kit of claim 1 further comprising a spiral binder spine binding said plurality of pages and said cover together.

3. The kit of claim 1 further comprising:
   a second cover bound together along one edge of said plurality of pages, said second cover having a second cover aperture in said second cover, said second cover aperture aligned with said page apertures to define the three dimensional void;
   a second backdrop curtain attached onto said second cover, said second backdrop curtain covering said second cover aperture; and
   a second slide out panel slidably attached to said second cover, wherein said second slide out panel is mounted over said second cover aperture and positioned under said second backdrop curtain,
   wherein said torso of said marionette is insertable through said second cover aperture therein and extendible inwardly through said page apertures.

4. The kit of claim 1 wherein each page comprises a front side and a back side, wherein each side of each page has separate card holders attached to each side of each page.

5. The kit of claim 1 wherein the dimensions of each page aperture measures twenty-four inches by twenty inches.

6. The kit of claim 1 wherein each story card of said plurality of story cards comprises a portion of a story line text printed onto each story card of said plurality of story cards.

7. The kit of claim 1 wherein said card holder comprises a plastic sleeve attached to each page, wherein each story card is insertable between said plastic sleeve and each page.

8. The kit of claim 1 wherein said card holder comprises a first swath of material attached to each page and a second swath of material attached to each story card, wherein said first and second swaths of material are reversibly lockable together.

9. The kit of claim 8 wherein said first swath of material comprises a plurality of minuscule hooks extending outwardly from said first swath of material, and said second swath of material comprises a plurality of minuscule loops extending outwardly from said second swath of material, wherein said plurality of minuscule hooks of said first swath of material are reversibly lockable together with said plurality of minuscule loops of said second swath of material.

10. The kit of claim 8 wherein said first swath of material comprises a plurality of minuscule loops extending outwardly from said first swath of material, and said second swath of material comprises a plurality of minuscule hooks extending outwardly from said second swath of material, wherein said plurality of minuscule loops of said first swath of material are reversibly locakable together with said plurality of minuscule hooks of said second swath of material.

11. The kit of claim 1 wherein said cover backdrop curtain comprises a cloth fabric.

12. The kit of claim 3 wherein said second cover backdrop curtain comprises a cloth fabric.

13. A puppet book kit consisting essentially of:
   a plurality of pages bound together along one edge;
   a cover bound together along one edge of said plurality of pages;
   an aperture in each of said pages and in said cover, said page apertures positioned at substantially the same location on each page, and said cover apertures aligned with said page apertures to define a three dimensional void;
   a backdrop curtain attached onto said cover, said backdrop curtain covering around said cover aperture;
   a slide out panel slidably attached to said cover, wherein said slide out panel is mounted over said cover aperture and positioned under said backdrop curtain;
   at least one card holder attached to each page;
   a plurality of story cards, each story card is attachable to each card holder; and
   at least one marionette, each marionette having a handle and a torso attached to said handle, said torso of said marionette is insertable through said cover aperture therein and extendible inwardly through said page apertures, said torso of said marionette is sized to pass through the aperture in each of said pages as said pages are turned.

14. A method of using a puppet book kit for stimulating children to read, the method comprising the steps of:
   obtaining the kit comprising:
      a plurality of pages bound together along one edge;
      a cover bound together along one edge of the plurality of pages;
      an aperture in each of the pages and in the cover, the page apertures positioned at substantially the same location on each page, and the cover apertures aligned with the page apertures to define a three dimensional void;
      a backdrop curtain attached onto the cover, the backdrop curtain covering around the cover aperture;
      a slide out panel slidably attached to the cover, wherein the slide out panel is mounted over the cover aperture and positioned under the backdrop curtain;
      at least one card holder attached to each page;
      a plurality of story cards, each story card is attachable to each card holder, wherein each story card of the plurality of story cards having a portion of a story line text printed onto each story card of the plurality of story cards; and
      at least one marionette, each marionette having a handle and a torso attached to the handle, the torso of the marionette is insertable through the cover aperture therein and extendible inwardly through the page apertures, the torso of the marionette is sized to pass through the aperture in each of the pages as the pages are turned;
   attaching each story card to a corresponding card holder to sequentially build the story line;
   supporting the kit onto an easel;
   removing the slide out panel attached to the cover;
   turning open a given page of said plurality of pages;
   sliding a portion of the marionette underneath the backdrop curtain and through the cover aperture so that the torso of the marionette passes through the aperture of each of the unturned opened pages of said plurality of pages;
   reading out loud the portion of the story line text printed onto the story card attached to the given page;
   moving the torso of the marionette to mimic the portion of the story line text printed onto the story card attached to the given page, said moving step performed simultaneous to said reading step;
   repeating said steps of turning, sliding, reading, and moving until the story line is performed;
   taking out the marionette from underneath the backdrop curtain and away from the cover aperture so the marionette no longer passes through the aperture of each of the unturned opened pages of said plurality of pages; and
   adjoining slidably the slide out panel to the cover.

* * * * *